Patented June 11, 1940

2,204,109

UNITED STATES PATENT OFFICE 2,204,109

VEGETABLE OIL REFINING

Benjamin H. Thurman, Bronxville, N. Y., assignor to Refining, Inc., Reno, Nev., a corporation of Nevada No Drawing. Application October 6, 1938, Serial No. 233,689

5 Claims. (Cl. 260—423)

This invention relates to the refining of vegetable oils and more particularly to the partial refining of such oils to remove and recover minor constituents such as phosphatides.

The removal of gums by employing such reagents as water, weak acids or alkaline solutions and solutions of alkali, acid or neutral salts, in so-called "degumming" processes, has been suggested. Such degumming processes have been carried out in either continuous or batch operations although continuous operations have been found more satisfactory because of difficulty in securing effective separation of the precipitated gums from the oil. In accordance with the present invention, I have discovered that solutions of hydrogen peroxide form effective agents for precipitating the minor constituents to render them separable from the oil and that many important advantages over known degumming reagents are obtained by the use of hydrogen peroxide solutions. Effective separation of the precipitated materials from the oil is easily accomplished either in continuous or batch operations; the recovered gums or minor constituents are lighter in color and contain less free oil than with known agents; both the oil and the materials precipitated and separated from the oil are stabilized against rancidity; the separated materials are to a large extent deodorized and in the case of cotton seed oil the gossypol forming part of the separated materials is rendered innocuous. In addition, no foreign material is left in either the oil or the separated minor constituents as is the case when solutions of electrolytes are employed, since the hydrogen peroxide will break down into water and oxygen, which is easily removed from the treated products without the necessity of washing operations.

In carrying out the process of the present invention, a solution of hydrogen peroxide is thoroughly admixed with the crude vegetable oil to be partially refined. Minor constituents, such as phosphatides, resins, inhibitols, proteinaceous materials as well as coloring matter, are thereby rendered insoluble in the oil and can be removed therefrom by centrifugal separation or by a settling operation. In a preferred operation, properly proportioned streams of the oil and reagent are admixed in a continuous flow mixer out of contact with the atmosphere, the mixture passed through a treating coil to provide time for complete precipitation of the minor constituents and is then delivered to a continuous centrifugal separator in which the precipitated materials are continuously centrifugally separated from the oil. Depending upon the type of oil being treated and the amount of minor constituents contained therein, the time of treatment between mixing and separation will vary over a considerable range, for example, from 5 to 30 minutes. It is preferred to carry the processes on at as low a temperature as practicable to secure efficient separation. Thus with certains oils the entire process can be carried on at temperatures as low as between 35° to 50° F. whereas with other oils it may be necessary to perform the separation at temperatures between 70° and 160° F. In the continuous processes the oil may be preheated in flow to the separation temperature prior to mixing the reagent therewith or the mixture may be heated in flow to the temperature found necessary for effective separation. In the batch process temperatures of separation vary in substantially the same manner with various oils as in the continuous process. However, mixing must be performed in batch operations at a relatively low temperature, for example, temperatures between 350° and 90° F. to avoid setting of the color of the oil due to prolonged exposure thereof to high temperatures. After mixing proper amounts of reagent with the oil and the mixture heated if necessary to the temperature found most effective for producing separation, the precipitated material is allowed to settle from the oil and the oil is decanted from the settled material. Such a batch operation inevitably results in a materially greater entrainment of oil in the separated materials than the continuous process.

The concentration of the hydrogen peroxide solution may vary within wide limits, for example, from 3 to 30%. The amount of reagent necessary for precipitation of the minor constituents and stabilizing thereof will vary between $\frac{1}{10}$ to 1% of the more concentrated solutions and ½ to 5% for the more dilute solutions of hydrogen peroxide. The lesser amount of reagent in each case is employed with oils having a relatively small amount of minor constituents whereas the larger amounts are employed with oils having greater amounts of minor constituents. No definite proportion applicable to all oils can, therefore, be given. In general, oils having a high free fatty acid content will contain larger amounts of minor constituents and will, therefore, require greater amounts of precipitating reagent than low free fatty acid oils.

As a specific example of a process employing the reagent of the present invention in a batch operation, crude cottonseed oil having a free fatty acid content of 0.67% was admixed with ½% of 15% hydrogen peroxide solution by agitating for 5 minutes at 70° F. The mixture was then heated to 120° F. with slow agitation for 10 minutes. Upon allowing the mixture to stand, a very light colored layer of gums settled out of the oil. The oil was then drawn off from the layer of gums. This remaining material was then washed several times with acetone to dehydrate the same and remove entrained oil. The resulting gum was then dissolved in petroleum ether to give a light pale yellow clear solution which, upon evaporation, yielded a pale yellow gum. When water alone or electrolytes are employed as precipitating reagents, the gums, including the phosphatides, from crude cottonseed oil are extremely dark in color when dissolved in solvents or when dissolved in solvents and the solvent thereafter evaporated.

The oil in the above example can also be subjected to a continuous partial refining operation by admixing the hydrogen peroxide solution in flow, heating the admixture in a heating coil and continuously centrifugally separating. In such continuous processes it is possible to preheat this oil to approximately 120° F. prior to mixing without setting the color in the oil. Substantially the same type of gum is produced by continuous centrifugal separation except that the amount of oil entrained in the gum is markedly less than for separation by settling. Furthermore, the batch mixing of the oil and reagent may be followed by continuous centrifugal separation, if the mixing is done in relatively small batches to avoid maintaining the mixture in a heated condition for extended periods of time. The batch of mixture is maintained under slow agitation while a stream thereof is being delivered to the centrifugal separator in order to prevent settling and stratification of the gums which would interfere with centrifugal separation.

It has been found that hydrogen peroxide is much more effective as a degumming reagent than water alone, since water fails to precipitate a material part of the gums. It furthermore renders unnecessary the washing or other steps ordinarily required to remove residual reagent when degumming reagents are employed. Such known degumming reagents as, for example, salt solutions or weak acid or alkali solutions, can however be employed in admixture with the hydrogen peroxide of the present invention with advantageous results if the presence of these reagents in the final product or the necessary removal steps are not objectionable. By using the hydrogen peroxide, both the separated materials and the oil are stabilized against rancidity. This is extremely important particularly with respect to the materials separated from the oil as gums removed by most precipitating reagents quickly ferment or putrefy. Separation of the precipitated gums from the oil is easily effected and the gums are much lighter in color than those resulting from processes employing non-precipitating reagents.

The present process is applicable to substantially all vegetable oils, for example, cottonseed oil, corn oil, soy bean oil, rapeseed oil, linseed oil, etc., containing gummy materials. Such oils may be either hot or cold pressed oils or solvent extracted oils. With solvent extracted oils the process may be carried on either in the presence of the extraction solvent or after removal thereof. The gummy materials are recovered in undamaged and stabilized form and may be used as such as a phosphatidic material. Purified phosphatides may be easily recovered from the gums by simple purification processes, for example, those disclosed in my copending application, Serial No. 6,446, filed February 14, 1935.

Although I have disclosed preferred embodiments of my invention, it is understood that I am not to be limited thereto but the details of the invention may be varied within the scope of the following claims:

I claim:

1. The process of separating minor constituents including phosphatidic material from vegetable oils containing the same without destruction of said phosphatidic material, which comprises, admixing a small proportion of a solution of hydrogen peroxide therewith to precipitate said minor constituents and separating the precipitated constituents from the oil by difference in specific gravity.

2. The process of separating minor constituents including phosphatides from crude vegetable oils without destroying said phosphatides, which comprises, continuously mixing a stream of crude vegetable oil with a stream of hydrogen peroxide solution, continuously advancing said mixture while said hydrogen peroxide reacts in minor constituents in said oil to precipitate the same and thereafter continuously centrifugally separating the precipitated minor constituents from the oil.

3. The process of recovering phosphatidic material from crude vegetable oils, which comprises, admixing with said vegetable oil between approximately $\frac{1}{10}$ to 5% of a 3 to 30% aqueous solution of hydrogen peroxide to precipitate said phosphatidic material and thereafter separating the phosphatidic material from said oil by differences in specific gravity.

4. The process of recovering stabilized phosphatidic material from crude vegetable oils, which comprises, admixing an aqueous solution of hydrogen peroxide with said oil in an amount sufficient to precipitate phosphatidic material contained in said oil and stabilize the same against rancidity, and thereafter separating said oil from said precipitated material.

5. The process of removing minor constituents including phosphatidic material from crude vegetable oil, which comprises, mixing a small proportion of an aqueous solution of hydrogen peroxide with said oil at a temperature between 35 and 90° F., thereafter heating said mixture to a temperature between 100 and 160° F. and separating the precipitated constituents from said oil by difference in specific gravity.

BENJAMIN H. THURMAN.

CERTIFICATE OF CORRECTION.

Patent No. 2,204,109. June 11, 1940.

BENJAMIN H. THURMAN.

It is hereby certified that error appears in the printed specification of the above numbered patent requiring correction as follows: Page 1, second column, line 24, for "350°" read --35°--; and that the said Letters Patent should be read with this correction therein that the same may conform to the record of the case in the Patent Office.

Signed and sealed this 1st day of July, A. D. 1941.

(Seal)

Henry Van Arsdale,
Acting Commissioner of Patents.